C. L. PEIRCE, Jr.
CABLE HANGER.
APPLICATION FILED MAY 31, 1905.
909,448.
Patented Jan. 12, 1909.
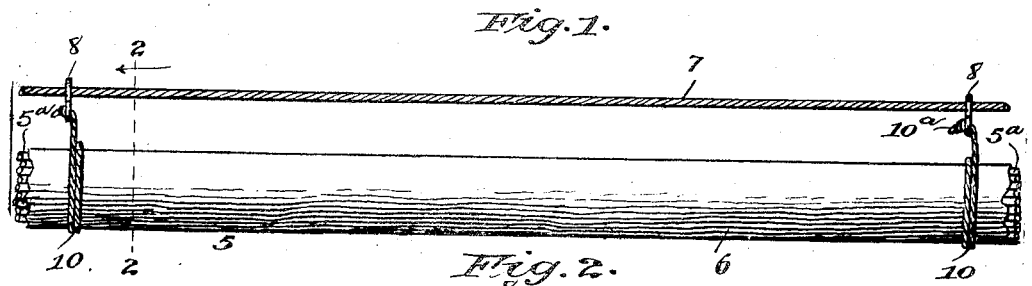
Fig. 1.
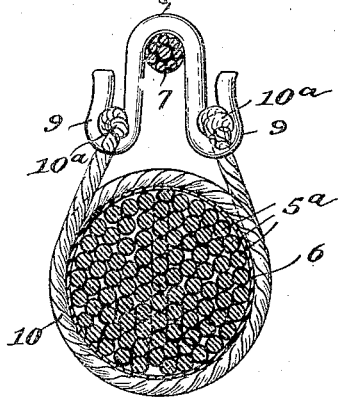
Fig. 2.
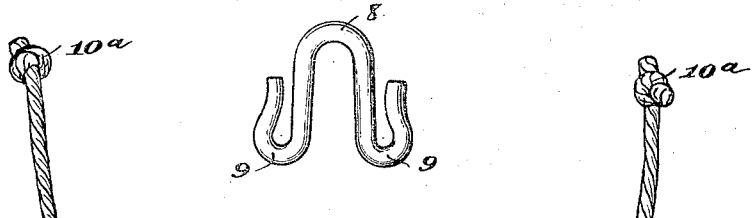
Fig. 3.
Fig. 4.
Witnesses,
F. S. Mann
S. N. Pond
Inventor
Charles L. Peirce, Jr.,
By Offield, Towle & Linthicum
Attys.

UNITED STATES PATENT OFFICE.

CHARLES L. PEIRCE, JR., OF CHICAGO, ILLINOIS, ASSIGNOR, BY MESNE ASSIGNMENTS, TO THE W. G. NAGEL ELECTRIC COMPANY, OF TOLEDO, OHIO, A CORPORATION OF OHIO.

CABLE-HANGER.

No. 909,448.    Specification of Letters Patent.    Patented Jan. 12, 1909.

Application filed May 31, 1905. Serial No. 263,144.

*To all whom it may concern:*

Be it known that I, CHARLES L. PEIRCE, Jr., a citizen of the United States, residing at Chicago, in the county of Cook and State of Illinois, have invented certain new and useful Improvements in Cable-Hangers, of which the following is a specification.

My invention relates to devices for suspending and supporting wires and cables, more particularly such as constitute electrical conductors for telegraph and telephone circuits.

As is well known, the heavy cables made up of a plurality of individual wires which constitute the trunk lines of telegraph and telephone circuits are incapable of supporting their own weight when suspended from poles spaced apart at the usual intervals. Hence has arisen the practice of hanging such cables from steel cables themselves supported on the poles or other regular supports; the means for thus suspending the electric cables comprising hanger devices passing around the latter and hooked over the steel suspension cable at frequent intervals. These latter devices have in many cases proved unsatisfactory both on account of their liability to become displaced and put out of service, and because of their relatively high cost of construction, manipulation and maintenance. These hangers usually comprise a bent wire hook engaging the steel suspension cable, and a loop of cord or rope suitably secured to said hook and this loop wound around the cable to be supported. Such a construction, in order to be secure and reliable, requires one end of the hook to be closed around the suspension cable after having been hooked over the latter. It also involves the use of a needless length of cord or rope engaging the supporting cable in order to insure sufficient strength at the weakest point which is where said cord or rope engages and is secured to the wire hook.

My invention has for its general object to provide a simplified and improved hanger of the character referred to; and more specifically to provide a hook not requiring manipulation to render it non-detachable from the supporting wire, and to provide, in association therewith, a rope or cord suspension member combining a maximum of strength with a minimum amount of material used.

To these ends my invention consists in a new and improved cable hanger possessing the peculiarities of construction and manner of manipulation substantially as hereinafter described and more definitely pointed out in the claims.

Referring to the accompanying drawing, which illustrates my invention in a preferred mechanical embodiment thereof,—Figure 1 shows in side elevation an electrical conductor cable and overhead supporting cable with my improved cable hanger applied thereto; Fig. 2 is a cross-sectional view, enlarged, on the line 2—2 of Fig. 1; Fig. 3 is a detail view detached of the wire hook member of the hanger; and Fig. 4 is a detail view of the cord member of the hanger unwound.

Referring to the drawings, 5 may designate the conductor cable made up, as herein shown, of a bunch of individual telegraph or telephone wires $5^a$ inclosed in a lead sheath or wrapper 6.

7 designates the usual steel supporting cable which carries the conductor cable 5.

My improved hanger whereby the conductor cable is suspended from the supporting cable 7 at intervals comprises a wire hook bent to present a central inverted U-shaped loop 8, and smaller U-shaped loops 9 lying on either side thereof, in association with a cord or rope 10 having knotted, looped or otherwise formed ends $10^a$, adapted to engage the loops 9. To apply the hanger, the wire hook is introduced over the supporting cable 7, the latter lying within the upper end of the central loop 8; one end of the cord 10 is engaged with one of said loops 9, the knot $10^a$ preventing said cord from pulling through said loop, the cord is then passed substantially once and a half around the cable 5, and the other knotted end of said cord is engaged with the opposite side of loop 9. Preferably, the loops 9 are made with relatively narrow or contracted upper ends, as shown, permitting the rope to be squeezed therethrough on entering, but resisting outward displacement of the rope in a well understood manner. By reason of this construction both the supporting and supported cables are confined within a closed loop formed by the wire and cord members of the hanger, neither of which cables can escape from said loop unless the same be opened at some point. The weight or downward pull of the heavy cable 5 normally maintains the knots 10ª drawn into snug engagement with their confining loops 9, while the contracted openings of the latter prevent accidental displacement, thereby rendering practically impossible any separation of the wire and cord members of the hanger while actually in use. On the other hand, in applying the hanger or removing the same, the operations are extremely simple, not requiring the tying of any knots or the bending of the wire hook after the same has been applied to the suspension cable. Of course, for the purpose of affording a direct vertical support, it is not essential that the cord 10 shall be passed entirely around the supported member; but I prefer to do this on account of the prevention which it affords to any tendency of the hanger to slide longitudinally of the cables, the greater being the weight of the cable 5, the more tightly being the grip of the cord thereupon. To remove the device, when necessary, it is not necessary to bend back any bent or twisted wires; the hanger being readily separated by simply drawing the cables toward each other sufficiently to enable either knotted end of the cord to be moved up and out of its coöperating loop.

It is evident that the exact form of the wire hook herein shown is not of the essence of the invention, so long as it be provided with means for suspension on the supporting cable and means on either side of said point of suspension to engage and hold the ends of the coöperating cord member of the hanger. Also, the enlarged ends 10ª of the cord may be formed by knotting the same, as shown, or in any other convenient way.

I claim:

1. A cable-hanger comprising a hook bent to provide a supporting cable-straddling member, and on either side thereof a cord-engaging member, in association with a cord held at its two ends by said cord-engaging members of the hook and adapted to underlie the supported cable, substantially as described.

2. A cable-hanger comprising a hook bent to form a central inverted U-shaped loop adapted to straddle a supporting cable and on either side thereof a U-shaped portion, in association with a cord having enlarged ends engaged and held by said U-shaped portions of the hook and adapted to underlie the supported cable, substantially as described.

3. The combination with a supporting cable and a supported cable, of a hanger comprising a hook bent to form a central inverted U-shaped loop straddling said supporting cable and having upwardly turned ends forming side loops on either side, and a cord passed around said supported cable and having knotted ends engaging said side loops of the hook, substantially as described.

4. A cable hanger consisting of a cable straddling member having depending ends on opposite sides of the cable receiving portion turned up to form securing means, and a pliant suspender coöperating with said securing means below the cable receiving portion.

5. A cable-hanger comprising a hook bent to provide a suspension cable-straddling member, and below and on either side thereof a cord-engaging member, in association with a pliant suspender held by the said cord engaging members.

6. A cable hanger consisting of a clip forming a loop for a supporting cable and having reversely bent end portions on opposite sides of the cable receiving portion forming loops for a suspender, one of said end loops being an open loop, and a pliant suspender adapted to pass through said end loops.

7. A cable hanger consisting of a clip forming a loop for a supporting cable and depending ends on opposite sides of said loop, one end of said clip being reversely bent and the extremity brought into proximity to the body of the clip to form a suspender retainer for holding the suspender against accidental escape and the other end of said clip being formed into an open loop suspender receiver, and a coöperating pliant suspender.

8. A cable hanger consisting of a clip forming a loop for a supporting cable, the ends of said clip on opposite sides of said loop being reversely bent and brought into proximity to the body of the clip to form suspender receiving openings in which the suspender will be held against accidental escape, and a pliant suspender adapted to coöperate with the clip.

CHARLES L. PEIRCE, Jr.

Witnesses:
SAMUEL N. POND,
FREDERICK C. GOODWIN.